United States Patent [19]
Guthrie et al.

[11] 4,160,076
[45] Jul. 3, 1979

[54] SIMULATED NATURAL SPONGE BASED ON HYDROPHILIC POLYURETHANE

[75] Inventors: James L. Guthrie, Ashton; Donald J. Bach, Baltimore, both of Md.

[73] Assignee: W. R. Grace & Co., New York, N.Y.

[21] Appl. No.: 816,055

[22] Filed: Jul. 15, 1977

Related U.S. Application Data

[63] Continuation-in-part of Ser. No. 577,969, May 15, 1975, abandoned.

[51] Int. Cl.² .................. C08G 18/14; C08G 18/10; C08G 18/48
[52] U.S. Cl. .................................. 521/159; 521/116; 521/905; 521/914; 252/351; 252/DIG. 1
[58] Field of Search .................. 260/2.5 AD, 2.5 AG

[56] References Cited
U.S. PATENT DOCUMENTS

| | | | |
|---|---|---|---|
| 3,007,883 | 11/1961 | Schmidt et al. | 260/2.5 AG |
| 3,022,335 | 2/1962 | Lundsted | 260/615 B |
| 3,036,130 | 5/1962 | Jackson et al. | 260/615 B |
| 3,098,048 | 7/1963 | Shelanski et al. | 260/2.5 AG |
| 3,203,955 | 8/1965 | Jackson et al. | 260/615 B |
| 3,382,176 | 5/1968 | Jakobi et al. | 252/89 |
| 3,489,698 | 1/1970 | Morehouse | 260/2.5 AP |
| 3,861,993 | 1/1975 | Guthrie | 428/212 |
| 3,874,964 | 4/1975 | Cogliano et al. | 260/2.5 AD |
| 3,890,254 | 6/1975 | Guthrie | 260/2.5 AP |

Primary Examiner—H.S. Cockeram
Attorney, Agent, or Firm—Richard P. Plunkett; Philip M. Pippenger

[57] ABSTRACT

The invention disclosed is for new improved hydrophilic crosslinked polyurethane foams which simulate natural sponges and prepared by reacting an isocyanate capped polyoxyethylene polyol reactant with an aqueous reactant and a carefully balanced combination of a nonionic surface-active agent and a liquid defoaming agent. The resultant foams are characterized by a majority of large size cells and membranes which themselves are foamed with small cells.

8 Claims, 3 Drawing Figures

SIMULATED NATURAL SPONGE BASED ON HYDROPHILIC POLYURETHANE

CROSS-REFERENCE TO RELATED INVENTIONS

This application is a continuation-in-part of Ser. No. 577,969 filed May 15, 1975 by James Leverette Guthrie and Donald John Bach now abandoned. U.S. Pat. Nos. 3,861,993 and 3,890,254 are also relevant.

BACKGROUND OF INVENTION

This invention relates to new improved hydrophilic crosslinked polyurethane foams which simulate natural sponges and to a method for their preparation. More particularly, the present invention relates to hydrophilic foams prepared from a capped polyoxyethylene polyol reactant having a defined average reaction functionality greater than two, an aqueous reactant and a carefully balanced combination of a nonionic surface-active agent and a liquid defoaming agent.

Numerous attempts have been made in the prior art to produce hydrophilic polyurethane foams which simulate natural sponges. Typically, the product foams are either open-celled structures having membranes substantially intact or otherwise are reticulated with membranes substantially removed. By practice of the present invention, however, a foam is generated which more closely simulates natural sponges by having a majority of large cells and interconnecting membranes which themselves are foamed with very small cells. These improved new hydrophilic crosslinked polyurethane foams may be prepared simply by reacting a particular isocyanate capped polyoxyethylene polyol with an aqueous reactant and a carefully balanced combination of nonionic surface-active agent and a liquid defoaming agent.

Figure 1:
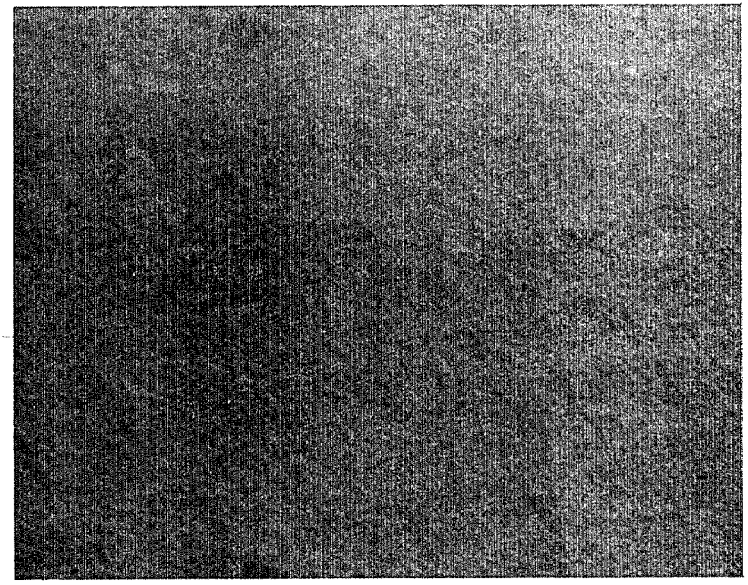
FIG. 1 is a conventional polyurethane foam with small, uniform open cells as prepared by the process of Example 1.

Generally stated, the present crosslinked hydrophilic foam may be prepared by capping polyoxyethylene polyol containing more than 2 hydroxy groups with a polyisocyanate such that the capped product has a reaction functionality greater than two. The capped product is foamed simply by combining with an aqueous reactant and a particular combination of nonionic surface-active agent and liquid defoaming agent. Optionally, the capped product and/or aqueous reactant may contain a suitable crosslinking agent if desired, in which case the capped polyoxyethylene polyol product may have a functionality greater than 2.

Desirably, a polyol is capped with a polyisocyanate such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional reactive component such as one having from three up to about eight or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 20,000, and preferably between about 600 to about 6,000, with a hydroxyl functionality of about 2 or greater, preferably from about 2 to about 8.

Polyoxyethylene polyol is capped by reaction with a polyisocyanate. The reaction may be carried out in an inert moisture-free atmosphere such as under a nitrogen blanket, at atmospheric pressure at a temperature in the range of from about 0° C. to about 120° C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisothiocyanates and polyisocyanates such as PAPPI (a polyaryl polyisocyanate as defined in U.S. Pat. No. 2,683,730), tolylene diisocyanate, triphenylmethane-4,4',4''-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1,5-diisocyanate, xylene-alpha, alpha'-diisothiocyanate, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylenebis (phenylisocyanate), 4,4'-sulfonylbis (phenylisocyanate), 4,4'-methylene di-orthotolylisocyanate, ethylene diisocyanate, ethylene diisothiocyanate, trimethylenediisocyanate, diicyclohexyl methane-4,4'-diisocyanate, isophorone diisocyanate, 1,6-hexamethylene diisocyanate, 2,2,4-trimethyl-1,6-hexane diisocyanate, and the like. Mixtures of one or more of the organic isothiocyanates or isocyanates may be used as desired. The aromatic diisocyanates aliphatic and cycloaliphatic diisocyanates and polyisocyanates or mixtures thereof which are especially suitable are those which are readily commerically available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio.

The isocyanate capped polyoxyethylene polyol reaction products are formulated to give crosslinked, three-dimensional network polymers on foaming.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing a starter component such as glycerol, trimethylolpropane, or trimethylolethane and the like which leads to polyoxyethylene triols. Starter components such as pentaerythritol and sucrose likewise treated with ethylene oxide lead to polymeric polyoxyethylene tetrols and octols, respectively. Alternatively, polyols suitable for capping with polyisocyanate may be prepared from diols, triols, tetrols, hexols, octols and polycarboxylic acids.

Almost any polyoxyethylene diols, triols, tetrols, hexols or octol may be capped with isocyanate end groups by reaction with an appropriate amount of a polyisocyanate. Further, blends or mixtures of the various polyols and/or polyisocyanates may be used as desired so long as the total average isocyanate functionality of the final urethane containing reaction product is greater than two.

Another possible mode used to prepare the capped polyoxyethylene polyol reaction product having an average isocyanate functionality greater than two is by reacting polyoxyethylene glycol having a reactive functionality equal to 2, with a molar excess of a diisocyanate which leads to an isocyanate capped polyurethane product having an isocyanate functionality of two. A polyol such as pentaerythritol having a reactive functionality equal to 4 is reacted with a large molar excess of diisocyanate to form an isocyanate capped polyurethane intermediate product having an isocyanate functionality of four. By blending the two isocyanate capped products thus prepared in various molar proportions, the resulting product mixture has an average isocyanate functionality greater than two.

In addition, other monomeric or polymeric polyisocyanate crosslinking agents may be substituted for the tetraisocyanate. Tolylene-2,4,6-triisocyanate having a reactive functionality of 3 is an example of a simple monomeric triisocyanate which may be usefully employed to impart an average isocyanate functionality greater than two.

Still another useful mode for preparing crosslinked hydrophilic polyurethane foams is by using an isocyanate capped polyoxyethylene polyol reaction product having an average functionality of about two. The technique following is crucial for those formulations where the average isocyanate functionality is only about two, because treatment with a large amount of water in foaming yields only a substantially linear, soluble thermoplastic foam having very little, practical or commercial utility. Thus, when it is desired to carry out the foaming reaction using this latter technique, water is pre-treated to contain a polyfunctional crosslinking agent which is reactive with isocyanate end groups of the capped reaction product. The presence of the crosslinking agent is crucial when the isocyanate capped reaction product has a functionality of only about two and optional when the functionality is greater than two.

The crosslinking agents desirably should be polyfunctional and reactive with isocyanate groups and include but are not limited to materials such as diethylenetriamine, triethylenetetramine, tetraethylenepentamine, polyethyleneimine, glycerol, trimethylolpropane, pentaerythritol, tolylene-2,4,6-triamine, ethylene diamine, aminoethanol, trimethylenediamine, tetramethylenediamine, pentamethylenediamine, hexamethylenediamine, tetramethylenediamine, pentamethylenediamine, hexamethylenediamine, ethanolamine, diethanolamine, hydrazine, triethanolamine, benzene-1,2,4-tricarboxylic acid, nitrilotriacetic acid, citric acid, 4,4'-methylenebis-(o-chloroaniline), and the like.

It has also been found that the capped polyoxyethylene polyol having an isocyanate functionality greater than two used to prepare a three-dimensional network polymer must be present in an amount sufficient to insure formation of the dimensional network. Thus, amounts of the capped polyoxyethylene polyol having an isocyanate functionality greater than two in the component to be foamed range from about 3% by weight of this component up to 100% by weight. Thus, it is possible to include a capped polyoxyethylene polyol having a terminal member with an isocyanate functionality of two, i.e., a diisocyanate in an amount from 0% by weight up to about 97% by weight of the component to be foamed. The maximum amounts of diisocyanate used are limited to that necessary to permit crosslinking to take place during foaming, as contrasted to formation of a linear polymeric structure, and the properties desired in the finally prepared foam.

It is possible to incorporate various amounts of a relatively hydrophobic comonomer into the ethylene oxide based polymerization products. Comonomers such as propylene oxide or butylene oxide may be copolymerized as a random copolymer, block-copolymer, or both, such that the copolymers remain hydrophilic. Up to about 40–60 mole percent but desirably about 25–45 mole percent of the relatively hydrophobic comonomer may be copolymerized with the ethylene oxide monomer and still yield a hydrophilic crosslinked network. Thus, polyoxyethylene polyol as used herein includes not only homopolymers of ethylene oxide but also hydrophilic copolymers of ethylene oxide wherein all of these polyol derivatives have a hydroxyl functionality of about two or greater and an ethylene oxide content ranging from about 40 mole percent to about 100 mole percent, and preferably greater than about 55 mole percent.

The combination of nonionic surface-active agent and liquid defoaming agent is critical to practice of the present invention. It appears that the special combination results in a foam structure wherein a majority of cells, i.e. greater than about 80% by volume, have large cell diameters between about 3 to about 10 mm. whereas the membranes which connect the cells, i.e. the cell walls are themselves foamed with cell performations which typically range from about 0.1 to about 1 mm. in average diameter and constitute about a minimum of 10% by volume of the cells.

Combinations of prepolymer and surface active agent are chosen in such a manner that as the foam rises and the principal cells expand, the interconnecting membranes stretch, but due to the use of the mixed combinations of agents, the stretching membranes develop thick and thin spots. The thin spots rupture or turn into very small cells while the thicker spots remain in place to form the foamed or perforated cell walls.

In more conventional true reticulation, it appears that the membranes get stretched uniformly so thin that they dissolve or break away completely. In more conventional open-celled foams, the membranes stay completely intact. In the present invention, however, an intermediate situation developes in which the cell wall includes bubbles or cells. The product foams so produced have a mildly abrasive texture closely representative of natural sponges without the unattractive features of becoming hard and stiff when dry which is a well known characteristic of natural or cellulosic sponges of the prior art.

The combination of nonionic surface-active agent and liquid defoaming agent is such that a high hydrophilic/lipophilic balance results in the range of about HLB 14 to about HLB 18 and preferably HLB 16.5 must be present for the nonionic surface-active agent whereas the liquid defoaming agent has a low hydrophilic/lipophilic balance of about HLB 5.5 to about HLB 8 and preferably about HLB 6.

Concentration of the liquid defoaming agent in the water phase prior to foaming reaction ranges from about 0.3% to about 3.0% by weight and preferably about 0.45% to about 2.0% by weight.

Concentration of the nonionic surface-active agent in the water phase prior to foaming reaction ranges from about 0.05% to about 0.3% weight and preferably about 0.07% to about 0.2% by weight.

Unless the above concentrations are followed, it appears that inclusion of materials outside the given ranges results in a foam having either poor texture characteristics or otherwise a foam which ultimately collapses.

Specific examples of useful nonionic surface-active agents useful herein include materials such as Pluronic P65, (HLB 17.0), P 75 (HLB 16.5), P84 (HLB 14), P85 (HLB 16), P94 (HLB 13.5) and P105 (HLB 15) all paste type nonionic surface-active agents by BASF Wyandotte for products prepared by capping poly(oxypropylene) of molecular weights such as about 2050 with ethylene oxide whereby about 50% of ethylene oxide capping results. Other similar nonionic, paste type surface-active agents may be similarly used.

Specific examples of useful liquid defoaming agents useful herein include materials such as Pluronic L-62, (HLB 7) also by BASF Wyandotte for a product prepared by capping poly(oxypropylene) of molecular weight of about 1750 with ethylene oxide such that the resultant liquid product is capped with about 20% by weight of ethylene oxide. Other similar nonionic, liquid-type defoaming agents and especially those of the "L" series of Pluronics may be similarly used, such as L-72 (HLB 6.5) and L-92 (HLB 5.5) by way of example.

The aqueous or water component for foaming may appear as water, a water slurry or suspension, a water emulsion, or a water solution having water soluble materials disposed therein. For convenience, the aqueous component is referred to herein simply as water reactant.

In typical polyurethane reactions known to the art, it is known to employ an excess of water in some prepolymer foaming formulations to obtain improved properties. This has been observed at page 43 in the publication by Saunders and Frisch entitled "Polyurethanes", published by Interscience Publishers, where it is further observed that if less than stoichiometric amounts of water are used, the foam is more crosslinked, firmer, has lower elongation and higher density. A large excess of water, they observe, will use up the free isocyanate groups, leaving insufficient isocyanate available for effective crosslinking and resulting in the formation of many free amino end groups. As water content increases, the foam density decreases and above 30–50% excess water results in a marked decrease in physical properties.

The dramatic way in which addition of water influences practice of the present invention is seen by consideration of the Water Index value which represents the ratio of equivalents of $H_2O \times 100$/equivalents of NCO.

Recognizing that in polyurethane foaming reactions, one mole of water ultimately consumes two NCO groups, i.e. 1.0 mole $H_2O$ equals 2 equivalents —OH which react with 2 equivalents of NCO, a Water Index Value of 100 indicates the equivalents of water and equivalents of isocyanate are balanced. An Index of 95 indicates that there is a 5% shortage of water equivalents while an Index of 105 indicates a 5% surplus of water equivalents. A slight shortage of water equivalents (i.e. a slight excess of isocyanate), usually 3–5%, is common practice in the prior art, particularly with flexible foams.

Using the present resin reactant and water in amounts from about 0.5 mole $H_2O$/mole NCO groups ($H_2O$ Index Value of 100) up to about 2 moles $H_2O$/mole NCO groups ($H_2O$ Index Value of 400) results in poor foaming unless materials such as surfactants and/or catalysts or the like are included. When using about 6.5 moles $H_2O$ mole/NCO groups ($H_2O$) Index Value of 1300) up to about 390 moles $H_2O$/mole NCO groups, ($H_2O$ Index Value 78,000) surprisingly good foams result which improve in characteristics with added amounts of molar water. Thus, the available water content in the aqueous reactant is from about an $H_2O$ Index Value of about 1300 to about 78,000 and desirably from about 4,000 to about 40,000.

Available water is water which is accessible for reaction with the resin reactant, and which is exclusive of water which may layer during reaction, or supplemental water which may be necessary because of further water-absorbtive or water-binding components or additives present in and forming the aqueous reactant.

The foaming reaction may proceed either as a batch reaction or as a continuous reaction. Either the resin reactant may be poured into the aqueous reactant, or both may be combined simultaneously such as when using spray or froth application techniques.

Large amounts of many water-soluble or water-dispersible materials may be added to the water reactant. These materials may be added to the aqueous reactant up to about 50% by weight of the amount of water depending of course on the particular material and its weight. Useful additives to the aqueous reactant include resin or wax dispersions, flame retardants, fungicides, fibers, cellulosics, biostats, pigments, dyes, enzymes, or the like. By homogeneously distributing these materials in the aqueous reactant, it is possible to effect wide distribution of these materials throughout the finally prepared foam. Some or all of the above additives may also be combined into the resin reactant if desired.

The present foams have great utility for decorative, cushioning, insulative, sound deadening, protective and/or fire retardant surfaces. Also, they find great utility as household, industrial and/or biomedical sponges.

The following examples will aid in explaining, but should not be deemed as limiting practice of the present invention. In all cases, unless otherwise noted, all parts and percentages are by weight.

EXAMPLE 1

Comparative Example — Open Cell Polyurethane Foam

Prepolymer A was prepared by admixing 2 molar equivalents of polyethylene glycol having an average molecular weight of 1,000 (PEG — 1,000) and one molar equivalent of trimethylolpropane (TMOP). The admixture was dried at 100°–110° C. under a pressure of 5–15 Torr to remove water. The resulting dried mixture was slowly added over a period of about one hour to a vessel containing 6.65 molar equivalents of toluene diisocyanate (TDI) while stirring the TDI and polyol mixture. The temperature was maintained at 60° C. The mixture was maintained at 60° C. with stirring for three additional hours. Then an additional 1.05 molar equivalent of TDI was added with stirring over a period of about one hour while maintaining the temperature at 60° C. The final reaction mixture contained a 10% molar excess of TDI. All hydroxyl groups were capped with isocyanate and some chain extension occurred because of crosslinking of the polyols with TDI.

Two hundred grams of Prepolymer A were reacted with 200 grams of water representing 11 moles and a mole $H_2O$/NCO group ratio of 22. A foam product was recovered having small, uniform open cells such as that illustrated in FIG. 1.

EXAMPLE 2

Comparative Example — Reticulated Polyurethane Foam

The procedure of Example 1 was repeated except further including in the resin portion, 20 grams of tolylene diisocyanate (TDI having about 80/20 mixture of 2,4 isomer/2,6 isomer), and 2 grams of Pluronic P-75, a nonionic surfactant by Wyandotte Chemicals Corp. consisting of a condensate of ethylene oxide with a hydrophobic base formed by condensing propylene oxide with propylene glycol.

Figure 2:
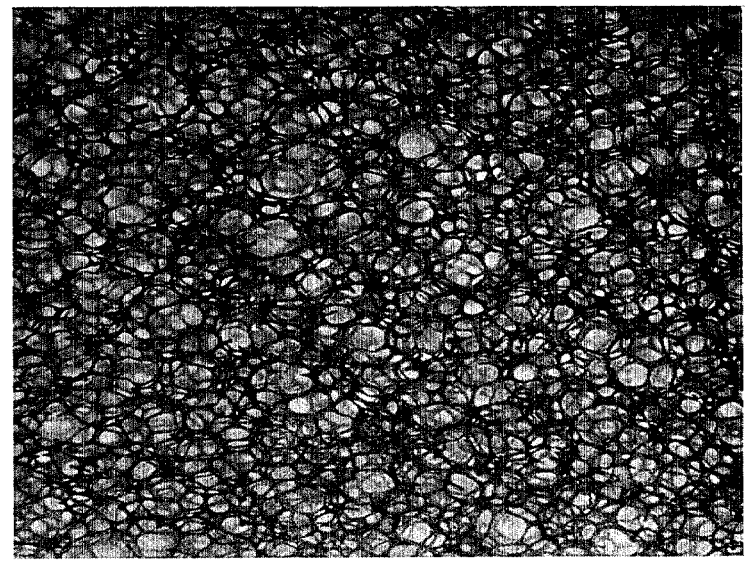
FIG. 2 is a reticulated polyurethane foam prepared by the process illustrated in Example 2.

Under otherwise corresponding reaction conditions, and photographic exposures, a reticulated foam product was recovered such as that illustrated in FIG. 2.

EXAMPLE 3

To 80 g. water was added 0.75 g. of Pluronic L-62, a product by BASF Wyandotte, made by capping poly(oxypropylene) of molecular weight 1750 with ethylene oxide so that the resulting liquid product is 20% ethylene oxide. To this solution was added 0.1 g. of Pluronic P-75, a product made by capping poly(oxypropylene)-glycol of molecular weight 2050 with ethylene oxide so that the resulting material was 50% ethylene oxide.

The aqueous solution of foam-control agents was stirred with 100 g. of Prepolymer A causing formation of a sponge with the desired texture.

A large piece of the same type of foam was made on a Martin-Sweets foam machine, using as the aqueous component a solution of 93.7 g. Pluronic L-62, 12.5 g. Pluronic P-75, 75 g. of a pigment, Calcotone Green, and 10,000 g. water. In a typical experiment, 266 g. of this solution was combined with 356 g. of Prepolymer A to tmake the foam.

EXAMPLE 4

Figure 3:
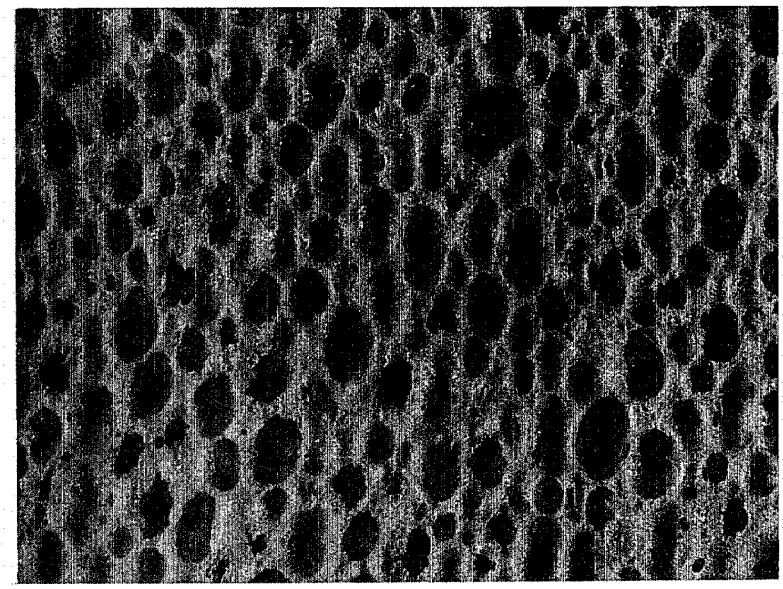
FIG. 3 is a sponge-like foam of the present invention.

Example 3 was repeated except that 0.33 g of commercially available Pluronic L-92, a non-ionic liquid surfactant having an HLB of 5.5, was substituted for the 0.75 g of Pluronic L-62 and 0.56 g of commercially available Pluronic P-105, a non-ionic paste having an HLB of 15.0 was substituted for the 0.1 g of Pluronic P-75. A sponge-like foam product such as illustrated in FIG. 3 was recovered.

EXAMPLE 5

Example 3 was repeated except that 0.50 g of commercially available Pluronic L-72, a non-ionic liquid surfactant having an HLB of 6.5, was substituted for the 0.75 g of Pluronic L-62 and 0.06 g of commercially available Pluronic P-85, a non-ionic paste having an HLB of 14.0, was substituted for the 0.1 g of Pluronic P-75. A sponge-like foam product such as illustrated in FIG. 3 was recovered.

Sponges made by the process of this invention made without auxiliary blowing agents normally have densities of about 4.0–7.5 and typically about 4.7–4.8 lb. per cubic foot (dry), they hold approximately six times their weight of water, yet have so little resistance to compression that a sponge squeezed by hand releases 70% of the water with little effort.

It is to be understood that the foregoing detailed description is given merely by way of illustration and that many variations may be made therein without departing from the spirit of this invention.

What is claimed is:

1. A method for preparation of new improved hydrophilic crosslinked polyurethane foams which simulate natural sponges which comprises reacting a first component comprising isocyanate capped polyoxyethylene polyol having a reaction functionality greater than two, said polyol being substantially void of reactive hydroxy groups and having a molecular weight of from about 200 to about 20,000, with a second component comprising aqueous reactant, the ratio of moles $H_2O$/moles NCO groups being about 6.5 to about 390 in said second and first components respectively, said aqueous reactant having dissolved therein a liquid defoaming agent and non-ionic surface-active agent, the non-ionic surface-active agent having a high hydrophilic/lipophilic balance in the range of about HLB 14 to about HLB 18, whereas the liquid defoaming agent has a low hydrophilic/lipophilic balance of about HLB 5.5 to about HLB 8, and wherein the concentration of the liquid defoaming agent in the aqueous water phase prior to the foaming reaction is from about 0.3% to about 3.0% by weight of the aqueous phase, and the concentration of the non-ionic surface-active agent in the aqueous water phase prior to the foaming reaction is from about 0.05% to about 0.3% by weight of the aqueous phase.

2. The method of claim 1 wherein the hydrophilic/lipophilic balance for the nonionic surface-active agent is about HLB 16 and that for the liquid defoaming agent is about HLB 6.

3. The product prepared by the method of claim 1.

4. The method of claim 1 wherein the liquid defoaming agent is present in an amount of about 0.45% to about 2.0% by weight and the nonionic surface-active agent is present in an amount of about 0.07% to about 0.2% by weight.

5. A method for preparation of new improved hydrophilic crosslinked polyurethane foams which simulate natural sponges which comprises reacting a first component comprising isocyanate capped polyoxyethylene polyol having a reaction functionality equal to two, said polyol being substantially void of reactive hydroxy groups and having a molecular weight of from about 200 to about 20,000, a second component comprising aqueous reactant, said aqueous reactant having dissolved therein a liquid defoaming agent and a non-ionic surface-active agent and a third component comprising a crosslinking agent having a reaction functionality greater than two and selected from the group consisting of polyol, polyisocyanate, polythiol and polyamine, the ratio of moles $H_2O$/moles NCO groups being about 6.5 to about 390 in said second and first components, respectively, the non-ionic surface-active agent having a high hydrophilic/lipophilic balance in the range of about HLB 14 to about HLB 18, whereas the liquid defoaming agent has a low hydrophilic/lyophilic balance of about HLB 5.5 to about HLB 8, and wherein the concentration of the liquid defoaming agent in the aqueous water phase prior to the foaming reaction is from about 0.3% to about 3.0% by weight of the aqueous phase, and the concentration of the non-ionic surface-active agent in the aqueous water phase prior to the foaming reaction is from about 0.05% to about 0.3% by weight of the aqueous phase.

6. The method of claim 5 wherein the hudrophilic/lipophilic balance for the nonionic surface-active agent is about HLB 16 and that for the liquid defoaming agent is about HLB 6.

7. The product prepared by the method of claim 5.

8. The method of claim 5 wherein the liquid defoaming agent is present in an amount of about 0.45% to about 2.0% by weight and the nonionic surface-active agent is present in an amount of about 0.07% to about 0.2% by weight.

* * * * *

UNITED STATES PATENT AND TRADEMARK OFFICE
CERTIFICATE OF CORRECTION

PATENT NO. : 4,160,076
DATED : July 3, 1979
INVENTOR(S) : James L. Guthrie et al It is certified that error appears in the above-identified patent and that said Letters Patent are hereby corrected as shown below:

In the Claims:

In column 8, line 68, delete the word "lyophilic" and insert therefor the word --lipophilic--.

Signed and Sealed this

Second Day of October 1979

[SEAL]

Attest:

RUTH C. MASON
Attesting Officer

LUTRELLE F. PARKER
Acting Commissioner of Patents and Trademarks